US011477098B2

(12) United States Patent
Power et al.

(10) Patent No.: US 11,477,098 B2
(45) Date of Patent: Oct. 18, 2022

(54) IDENTIFICATION OF CANDIDATE PROBLEM NETWORK ENTITIES

(71) Applicant: MICROSOFT TECHNOLOGY LICENSING, LLC, Redmond, WA (US)

(72) Inventors: Adrian Power, Seattle, WA (US); Peter John Hill, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 110 days.

(21) Appl. No.: 16/918,147

(22) Filed: Jul. 1, 2020

(65) Prior Publication Data

US 2020/0336395 A1 Oct. 22, 2020

Related U.S. Application Data

(63) Continuation of application No. 16/191,331, filed on Nov. 14, 2018, now Pat. No. 10,721,145, which is a (Continued)

(51) Int. Cl.
*H04L 43/062* (2022.01)
*H04L 41/0677* (2022.01)
(Continued)

(52) U.S. Cl.
CPC ........ *H04L 43/062* (2013.01); *H04L 41/0654* (2013.01); *H04L 41/0677* (2013.01); *H04L 43/0852* (2013.01); *H04L 43/16* (2013.01)

(58) Field of Classification Search
CPC ............... H04L 43/062; H04L 41/0654; H04L 41/0677; H04L 43/0852; H04L 43/16; H04L 12/00; H04L 12/1863
See application file for complete search history.

(56) References Cited

U.S. PATENT DOCUMENTS

2003/0161338 A1* 8/2003 Ng .......................... H04L 45/00 370/468
2004/0264434 A1* 12/2004 Weissberger ......... H04L 47/283 370/350

(Continued)

OTHER PUBLICATIONS

"Office Action Issued in Brazilian Patent Application No. 112016026998-5", dated Aug. 7, 2020, 5 Pages.

(Continued)

*Primary Examiner* — Gregory B Sefcheck
*Assistant Examiner* — Joshua Smith
(74) *Attorney, Agent, or Firm* — Shook, Hardy & Bacon L.L.P.

(57) ABSTRACT

The detection of network communication problems in networks that have multiple end nodes, and multiple transit nodes in between. One or more of the end nodes monitors one or more flows, creates associated flow information including performance information for each flow, and then reports the flow information. A system then estimates, for each of multiple flows within the network, a likely path that network traffic takes through that network. The system might then use performance information for each of the reported flows to identify at least one candidate problem network entity that is common amongst the estimated paths of the at least the subset of the plurality of flows.

20 Claims, 7 Drawing Sheets

600

601 Receive Flow Information

602 Estimate Paths

603 Identify Candidate Problem Network Entities

604 Mitigate Problem

Related U.S. Application Data continuation of application No. 14/310,974, filed on Jun. 20, 2014, now Pat. No. 10,135,704.

(51) Int. Cl.

| | |
|---|---|
| ***H04L 43/0852*** | (2022.01) |
| ***H04L 41/0654*** | (2022.01) |
| *H04L 43/16* | (2022.01) |

(56) References Cited

U.S. PATENT DOCUMENTS

| | | | | |
|---|---|---|---|---|
| 2009/0003313 | A1* | 1/2009 | Busch | H04L 12/4633 370/352 |
| 2009/0031035 | A1* | 1/2009 | Dharmaraju | H04W 12/0431 709/230 |
| 2009/0063708 | A1* | 3/2009 | Sultan | H04L 45/00 709/252 |
| 2012/0033567 | A1* | 2/2012 | Yamada | H04L 45/60 370/252 |

OTHER PUBLICATIONS

"Office Action Issued in Indian Patent Application No. 201647043365", dated Jul. 21, 2020, 6 Pages.

* cited by examiner

IDENTIFICATION OF CANDIDATE PROBLEM NETWORK ENTITIES

CROSS-REFERENCE TO RELATED APPLICATIONS

This application is a continuation of U.S. patent application Ser. No. 16/191,331 filed on Nov. 14, 2018, entitled "IDENTIFICATION OF CANDIDATE PROBLEM NETWORK ENTITIES," which is a continuation of and claims the benefit of and priority to U.S. patent application Ser. No. 14/310,974 filed on Jun. 20, 2014, entitled "IDENTIFICATION OF CANDIDATE PROBLEM NETWORK ENTITIES," which issued as U.S. patent Ser. No. 10/135,704 on Nov. 20, 2018, both of which are expressly incorporated herein by reference in their entirety.

BACKGROUND

Computing systems have transformed the way we work play and live. Modern computing systems can perform a wide variety of tasks as directed by the software and services that is available to the computing system. Computing systems are becoming increasingly connected to each other, thereby allow more cooperative interactivity between computing systems. Furthermore, high volumes of multimedia data are now delivered between computing systems. Accordingly, computing workflows are more than ever before dependent on reliable delivery over networks.

Networks are composed of a topology of interconnected computing systems (often referred to as "nodes" or "network nodes"). The channel between network nodes is referred to as a "link". When messages are delivered from one computing system to another, those messages may be transmitted over a certain flow traversing a path in the topology of linked nodes. The performance of network nodes and links may vary. Routing technology enables messages to take alternative paths if the performance of a particular path has degraded. When node or link performance has degraded significantly, that node or link may be placed out of use, repaired and/or replaced.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein related to the detection of network communication problems in networks that have multiple end nodes, and multiple transit nodes in between. In such networks, between any two given end nodes, there may be one or more flows. Each flow represents a path between the two corresponding end nodes that network traffic would likely take if that network traffic had certain characteristics. An example of such a network is a mesh network.

In accordance with embodiments described herein, one or more of the end nodes provide reports to support the detection of network communication problems. For instance, a given end node might monitor a flow, and create associated flow information for that flow. The flow information might include information regarding the endpoints of the flow, as well as performance information regarding the flow. The flow information is then reported.

In accordance with embodiments described herein, a system identifies candidate sources of network performance insufficiency. For instance, the system estimates, for each of multiple flows within the network, a likely path that network traffic takes through that network. The system might then use performance information for each of at least a subset of the plurality of flows to identify at least one candidate problem network entity that is common amongst the estimated paths of the at least the subset of the plurality of flows. As an example, that performance information may have been gathered from flow information reported by multiple end nodes.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein related to the detection of network communication problems in networks that have multiple end nodes, and multiple transit nodes in between. In such networks, between any two given end nodes, there may be one or more flows. Each flow represents a path between the two corresponding end nodes that network traffic would likely take if that network traffic had certain characteristics. An example of such a network is a mesh network.

In accordance with embodiments described herein, one or more of the end nodes provide reports to support the detection of network communication problems. For instance, a given end node might monitor a flow, and create associated flow information for that flow. The flow information might include information regarding the endpoints of the flow, as well as performance information regarding the flow. The flow information is then reported.

In accordance with embodiments described herein, a system identifies candidate sources of network performance insufficiency. For instance, the system estimates, for each of multiple flows within the network, a likely path that network traffic takes through that network. The system might then use performance information for each of at least a subset of the plurality of flows to identify at least one candidate problem "network entity" that is common amongst the estimated paths of the at least the subset of the plurality of flows. As an example, that performance information may have been gathered from flow information reported by multiple end nodes.

Some introductory discussion of a computing system will be described with respect to FIG. 1. Then, example methods and supporting architectures will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
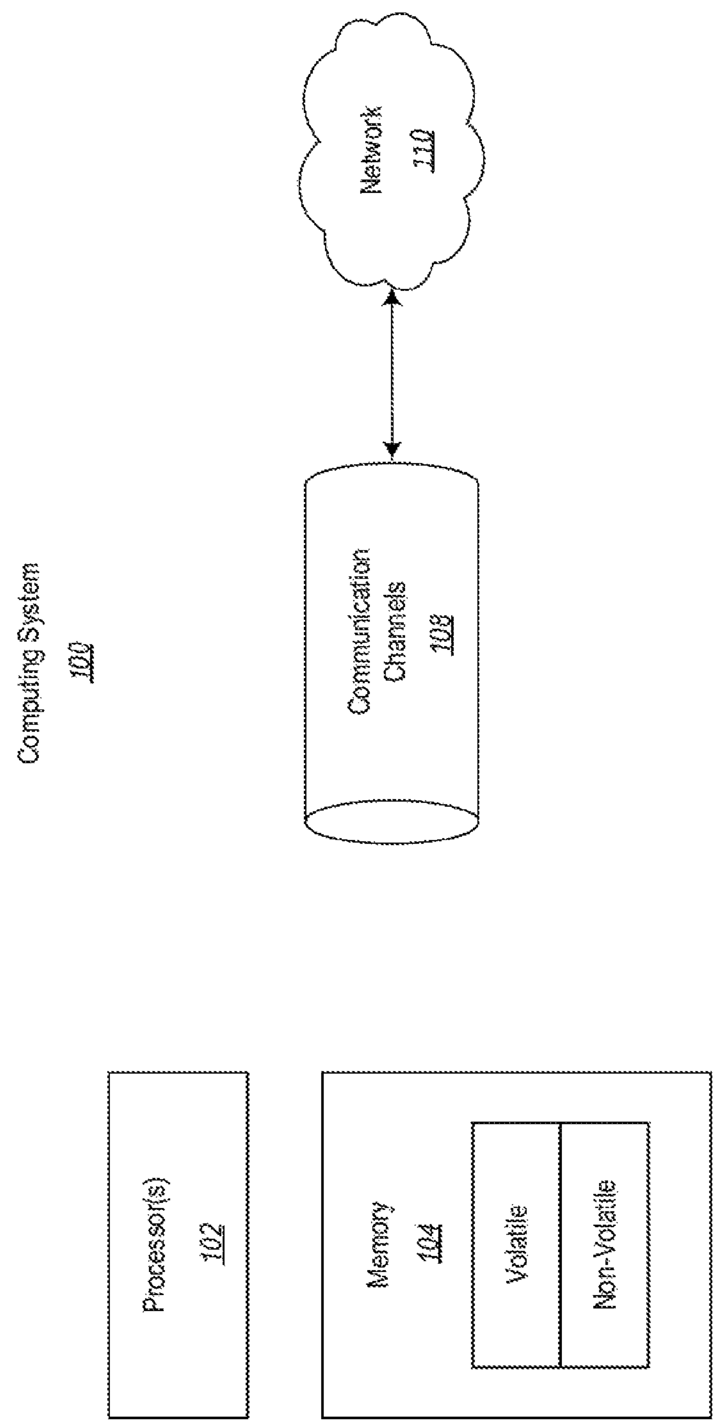
FIG. 1 illustrates an example computing system in which the principles described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
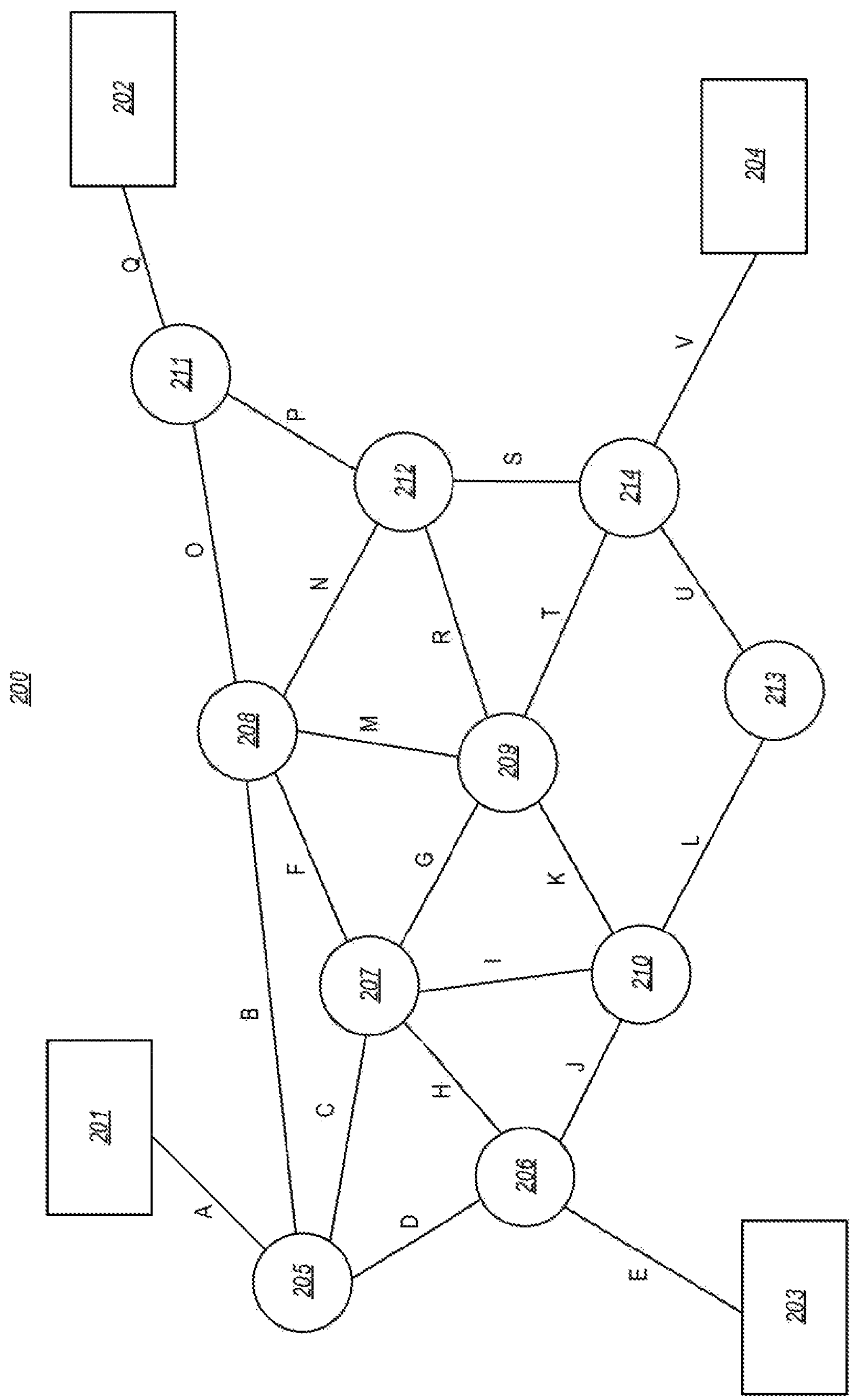
FIG. 2 illustrates an example network in which the principles described herein may be employed, which includes multiple end nodes coupled via a mesh of transit nodes and communication link sets.

FIG. 2 illustrates an example network 200 in which the principles described herein may be employed. Of course, network technology is characteristic in that almost any network topology can be employed. Accordingly, the principles described herein are by no means even remotely limited to networks having the same topology as the example network 200 and may apply regardless of the network topology. Nevertheless, as it is useful to have a specific example to describe technical principles, the network 200 will be referred to frequently as an example.

The example network 200 includes fourteen network nodes 201 through 214. The network nodes include four end nodes 201 through 204 (symbolized as rectangular), and ten transport nodes 205 through 214 (symbolized as circular). The end nodes 201 through 204 can communicate with each other by sending messages over the mesh of transport nodes 205 through 214.

The mesh is constructed via communication links, with each network node coupled to at least one other network node via a communication link set, each set including at one communication link. For instance, the network 200 is illustrated as including communication link sets A through V. Each communication link set A through V may comprise one or multiple or perhaps even numerous communication links.

An "end node" is a network node that is an endpoint of network communications, rather than a communication transit node. For instance, in FIG. 2, network nodes 201 through 204 are end nodes and are symbolically represented in FIG. 2 as being rectangular. The other network nodes 205 through 214 are transport nodes as symbolically represented in FIG. 2 as being circular.

In accordance with the principles described herein, the end nodes perform cooperative action with a system to allow the system to estimate a source of network problems. In particular, the end nodes report flow information, whereas the system uses that flow information to estimate a source of network problems.

Figure 3:
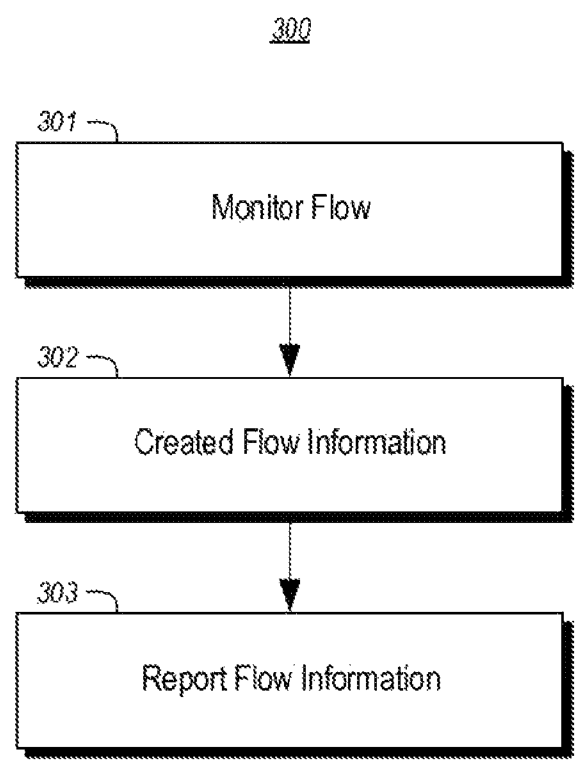
FIG. 3 illustrates a flowchart of a method for an end node to report regarding flows in the network.

FIG. 3 illustrates a flowchart of a method 300 for an end node to report regarding flows in the network. Referring to FIG. 2, the method 300 may be performed by each of the end nodes 201 through 204 in the network. In particular, the end node monitors (act 301) each of at least one flow. For each of the monitored flows, the end point creates (act 302) flow information that includes endpoint information regarding the flow, and that includes performance information regarding the flow. The end node then reports (act 303) the created flow information and accompanying performance information for at least one flow for which flow information was created.

As used in this description and in the claims, a "flow" is a set of network communications having sufficiently common characteristics that the network communications tend to follow the same path of consecutive communication links through the mesh of transit nodes. Accordingly, a flow may be thought of as corresponding to a path, where the flow includes those network communications that tend to use that path.

Figure 4:
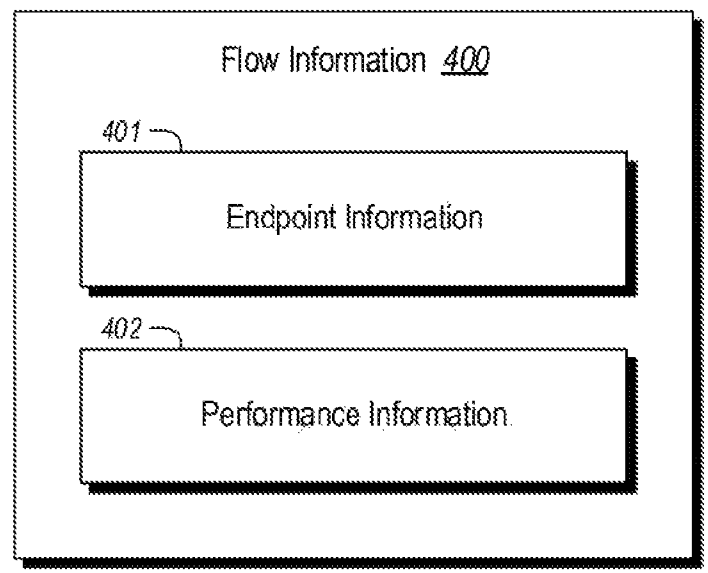
FIG. 4 illustrates an example of flow information that may be created by the end node for each flow being monitored.

FIG. 4 illustrates an example of flow information 400 that may be created by the end node for each flow being monitored. The flow information 400 includes endpoint information 401 and performance information 402.

The endpoint information 401 includes information that defines the endpoints of the flow and other information that defines the characteristics of the network communications of the flow that cause the network communications to tend to traverse the same path through the transport nodes. For instance, in one embodiment, the endpoint information 401 defines the Internet Protocol (IP) protocol address and TCP port information for both the source end node and the destination end node of the network communications that are included in the flow.

The performance information 402 might include any information regarding the flow that may be used to infer whether or not there is a problem with the path corresponding to that flow. As an examples only, the performance information 402 might include retransmission statistics for the flow, such as how many retransmissions of network communications have recently occurred, what the rate of retransmissions has been, what percentage of transmitted network communication end up being retransmitted, the maximum number of times the same network communication has been attempted for transmission, the average number of times that a network communication that had to be retransmitted ended up being retransmitted, and so forth. Alternatively or in addition, the performance information 402 might also include latency statistics for the flow. For instance, the latency statistics might include any one or more of the average time taken for a network communication to traverse the path, a standard deviation in the time taken for network communications to traverse the path, a maximum time taken for a network communication to traverse the path, and so forth.

Figure 5:
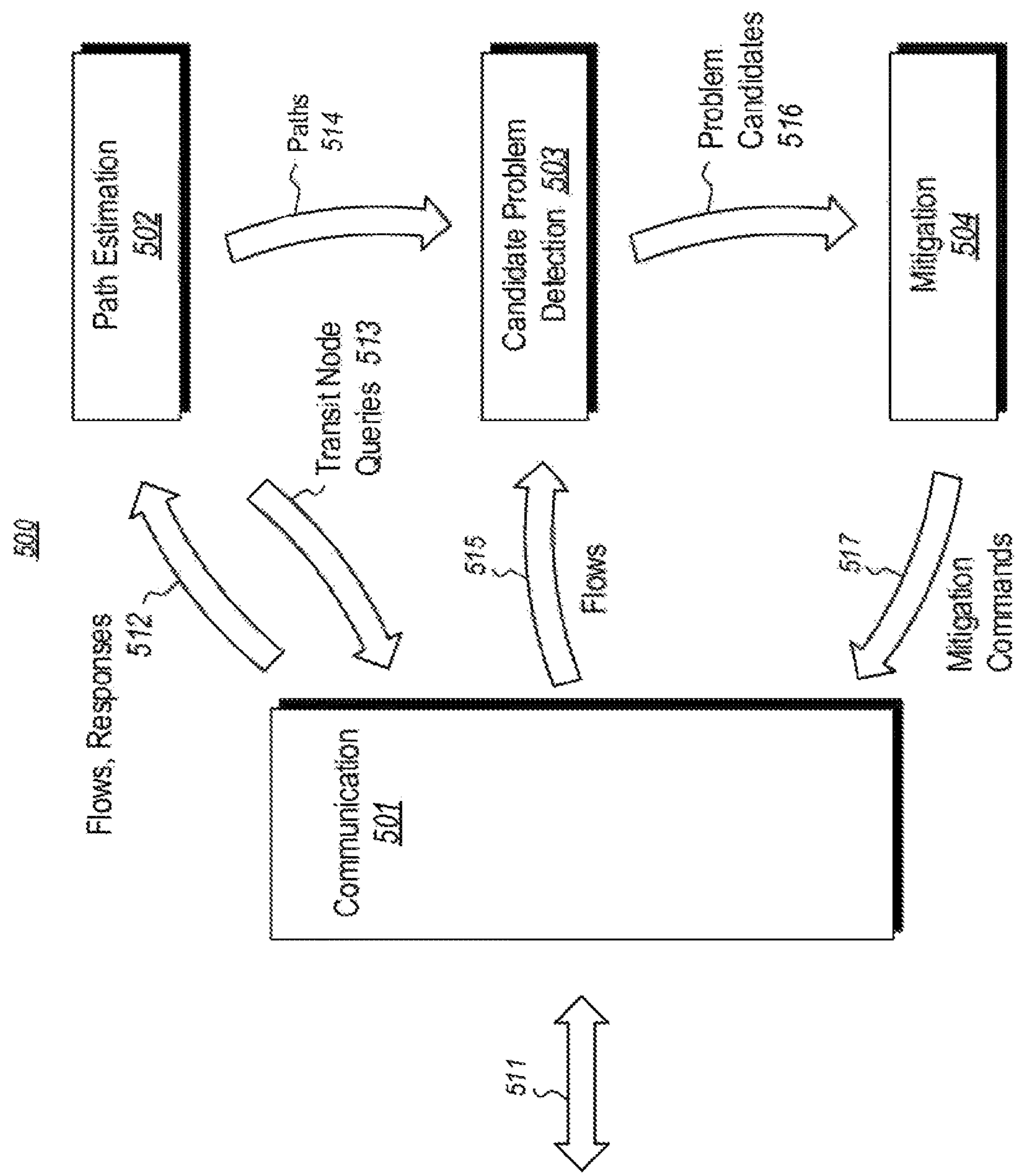
FIG. 5 abstractly illustrates a system that identifies a source of a network problem using flow information reported from one or more endpoints.

FIG. 5 abstractly illustrates a system 500 that identifies a source of a network problem using flow information reported from one or more endpoints. For instance, each of multiple endpoints in the network may report flow information for one or likely multiple flows to the system 500. This might then allow the system 500 to identify or estimate the path for each flow, identify those paths having problems using the respective flow information, and identify common network entities amongst those paths. The system 500 might further attempt to mitigate any problems that appear in the network entities that are common amongst problematic flows.

The system 500 includes a communication component 501 that is capable of communicating with each of the network nodes in the network. For instance, in the network 200 of FIG. 2, the communication component 501 may communicate with each of the network nodes 201 through 214. As an example, the communication component 501 might receive the flow information from each of the end nodes 201 through 204 in response to the end nodes each performing the method 300.

The system 500 also includes a path estimation component 502 that is configured to use the flow information to estimate a likely path that network traffic for the flow takes through that network. The path estimation component 502 may perform this estimation for each of up to all of the flow information received by the system 500. In order to do so, the path estimation component 502 may use the communication component 501 to communicate with network nodes to find out how the network node would route traffic of the given flow. An example of how this might be performed will be described further below.

The system 500 also includes a candidate problem detection component 503, which is configured to use performance information from the flow information to identify at least one candidate problem network entity that is common amongst the estimated paths for flows that are demonstrating problems in performance. In order to do so, the candidate problem detection component accesses the performance information 402 from the flow information 400 for one or more flows, and also accesses the estimated path for each flow from the path estimation component 402.

The system 500 might also include a mitigation component 504 configured to use the candidate network entity identifications from the candidate problem detection component 503, and mitigate the problem accordingly. For instance, if the problem network entity is a transit node, the mitigation component 504 might configure neighboring transit nodes not to use the problematic transit node, or at least reduce the number of flows that are being routed through the problematic transit node. If the problem network entity is a communications link, the mitigation component 503 might configure the two transit nodes at each end of the communications link to reduce or eliminate usage of the problematic communication link. The mitigation component might also perform other corrective action including notifying one or more other components and/or users of the problem, scheduling mitigation activities, or the like.

The system 500 may be structured and operate as described above for the computing system 100 of FIG. 1. Accordingly, the system 500 represents an example of the computing system 100 of FIG. 1. Furthermore, the communication module 501, the path estimation component 502, the candidate problem detection component 503 and the mitigation component 504 may each be modules running on that computing system. Alternatively or in addition, each of the modules and components 501 through 504 might each be separate computing systems in a distributed environment.

Figure 6:
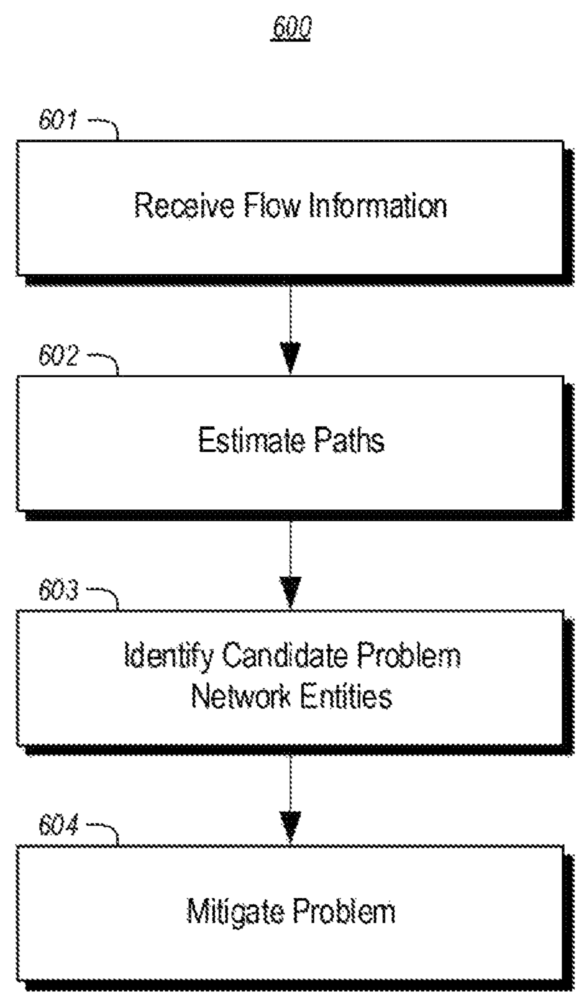
FIG. 6 illustrates a flowchart of a method for identifying a source for a network problem, and potentially mitigating the network problem.

The remaining flows within FIG. 5 will be described with respect to FIG. 6. FIG. 6 illustrates a flowchart of a method 600 for identifying a source for a network problem, and potentially mitigating the network problem. As the method 600 of FIG. 6 may be performed using the system 500 of FIG. 5, with respect to problem detection in the network 200 of FIG. 2, the method 600 will now be described with frequent reference to FIG. 6 as well as FIGS. 2 and 5.

In accordance with the method 600, the system receives flow information from end nodes in a network (act 601). For instance, the communication module 501 of FIG. 5 may receive that flow information over an interface (represented by arrow 511) from one or more of the end nodes. As an example, the communication module 501 might receive flow information from each of end nodes 201, 202 and 204 in the network 200 of FIG. 2. In this scenario, assume that the end node 203 is not capable of reporting flow information, and thus does not report.

The system then estimates (act 602) a path associated with each flow for which flow information is provided. For instance, in FIG. 5, the path estimation component 502 might perform this estimation using the flow information received (via arrow 512) from the communication module 501.

An example of how this estimation might occur will now be described with respect to a specific example. At the time that the flow information is reported, the flow information itself does not identify the path that the corresponding network communications of that flow take. However, the path estimation component 502 has knowledge of the network topology of the network it is evaluating (e.g., network 200 of FIG. 2), and is also aware of the source and destination end nodes for the flow based on the endpoint information included within the flow information.

Suppose in this example, that the source endpoint is end node 201 and the destination endpoint is the end node 202. The path estimation component 502 may thus query one transit node at a time to ask that transit node which would be the next node that it would route communications belonging to that flow. For instance the query (represented by arrow 513) would use communication module 501 to communicate with the respective transit node, whereas the responses would be received from the communication module 501 as again represented by the arrow 512.

For instance, in the context of a flow in which the source end point is end node 201 and the destination endpoint is end node 202, the transit node 205 would first be queried. The flow defining characteristics would be provided to the transit node 205 and asked where it would forward network communications having those characteristics and over which link. Suppose that the transit node responds that transit node 207 would be the next transit node and identifies a particular link of the communications link set C. The transit node 207 would then be queried with the same flow parameters. Suppose that the transit node 207 responds that transit node 208 would be the next transit node and identifies a particular link of the communication link set F. The transit node 208 would then be queried with the same flow parameters. Suppose that the transit node 208 responds that transit node 211 would be the next transit node and identifies a particular link of the communication link set 0. The transit node 211 would be queried with the same flow parameters, which would respond by identifying which communication link of the communication link set Q would be used to transmit messages of that flow to the end node 202.

The methodology may be used to estimate a path (representing a sequence of identified nodes and links) for each flow. Note that perfect certainty is not required for this estimation. There may even be multiple possible paths for a flow, each having an estimated probability of occurring. The candidate problem detection component 503 may deal with probabilistic models in information theory to estimate the candidate problem network component, to perhaps even high levels of probability, even if the path estimations are not definitive or have lower associated probabilities.

The system then identifies (act 603) at least one candidate problem network entity using the path estimations. For instance, in FIG. 5, the candidate problem detection component 503 receives the estimated paths for the flows (as represented by arrow 514). The candidate problem detection component also receives the performance information for each flow (as represented by arrow 515), either directly from the communication module 501 or perhaps indirectly via another component (such as the path estimation component 502).

The candidate problem detection component 503 can identify those flows that have problems, access the corresponding flows, and identify those network entities that are common amongst those paths. Those common network entities then become candidate problem network entities. Several examples will now be provided with respect to FIGS. 7 and 8.

Figure 7:
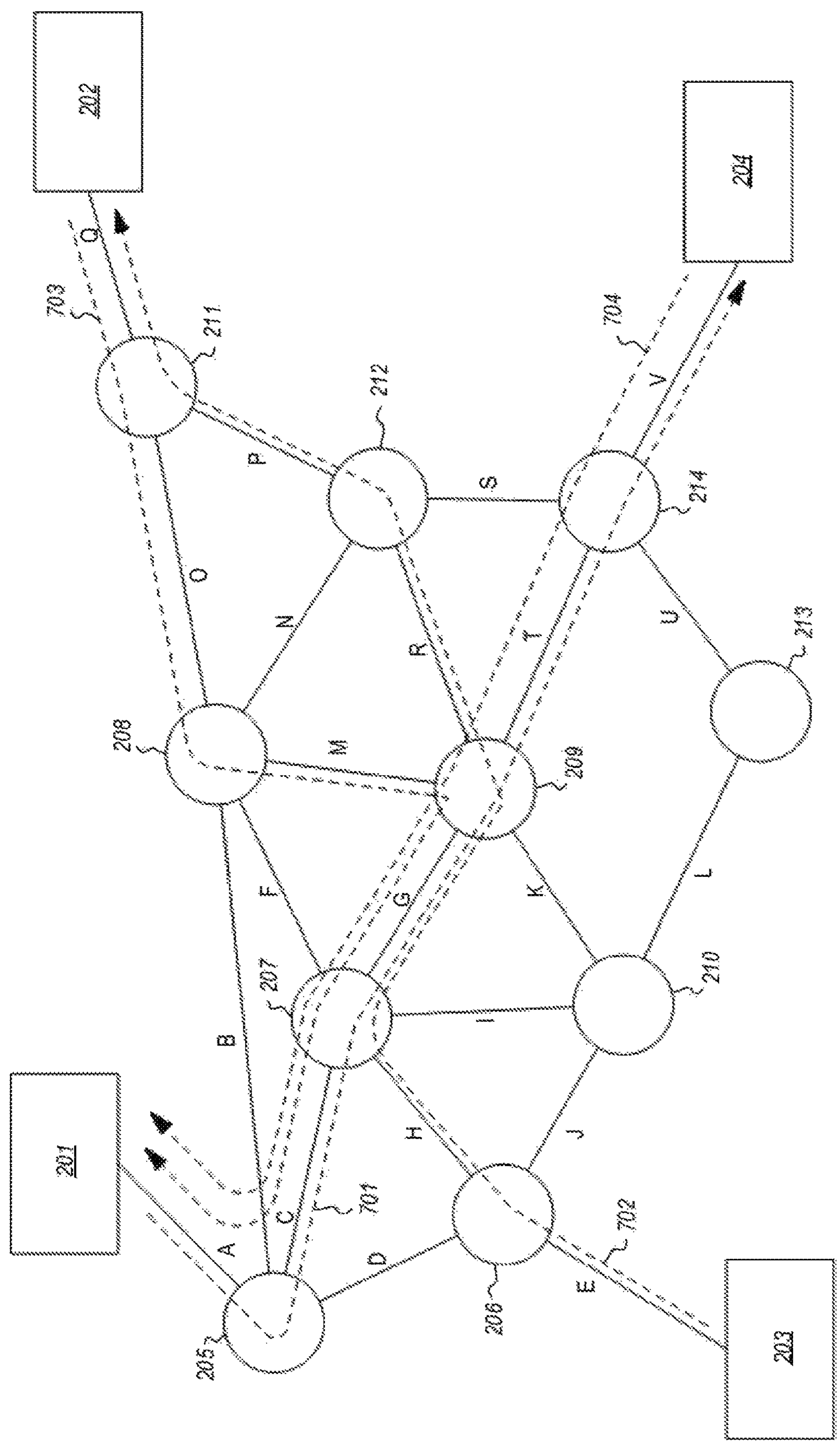
FIG. 7 illustrates the network of FIG. 2 but now with the paths of lower performance flows superimposed, and showing a candidate problem network entity being a communication link of the communication link set.

FIG. 7 illustrates the network 200 of FIG. 2 but now with the paths of lower performance flows superimposed. In this case, there are four problematic paths 701 through 704 discovered. The one common network entity amongst all of the paths 701 through 704 is the communications link set G. In fact, there might be just one communication link of the communications link set G that is faulty. Thus, the four problematic paths 701 through 704 might show that they all use that specific communication link within the communication link set G. Thus, that communication link within the communication link set G may be estimated as faulty. The more data is gathered regarding problematic flows, the more certain that estimation may become.

Referring again FIG. 5, the identity of the communication link would be sent (as represented by arrow 516) to the mitigation component 504. The mitigation component 504 might then attempt to mitigate the problem by sending mitigation commands (as represented by arrow 517), so that the communication module 501 may send the commands to the appropriate transit nodes in the network 200. For instance, in the case of a faulty communication link amongst the communication link set G, the mitigation component 504 might command the transit node 207 to route network traffic for fewer flows over that faulty communication link to the transit node 209, or might even command that transit node 207 not to use that faulty communication link at all. Likewise, the mitigation component 504 might command the transit node 209 to route network traffic for fewer flows over that faulty communication link to the transit node 207, or might even command that transit node 209 not to use that faulty communication link at all.

As previously mentioned, the path for a given flow might not be able to be detected with absolute certainty. In that case probabilistic models may be used to still identify the problem network entity with higher degrees of certainty. For instance, in the example of FIG. 7, suppose that there were 25 possible paths (some with a low probability of usage) associated with 8 lower performance flows. There might not be a single common network entities associated with all 25 possible paths. Nevertheless, suppose that 23 of the possible paths shared that same communication link within the communication link set, and only 2 possible paths (with relatively low probability of usage) did not use that communication link. Under those circumstance, that communication link within the communication link set G might still be estimated (with almost certainty) as being the faulty network entity. The communications system could also interact with network nodes (or even other monitoring systems) to gather additional information that may increase or decrease probability of a link issue. For example if the link shows some kind of error (corrupted input packets, lots of log messages, link status bouncing etc.) this would be very pertinent information to measuring probability.

Figure 8:
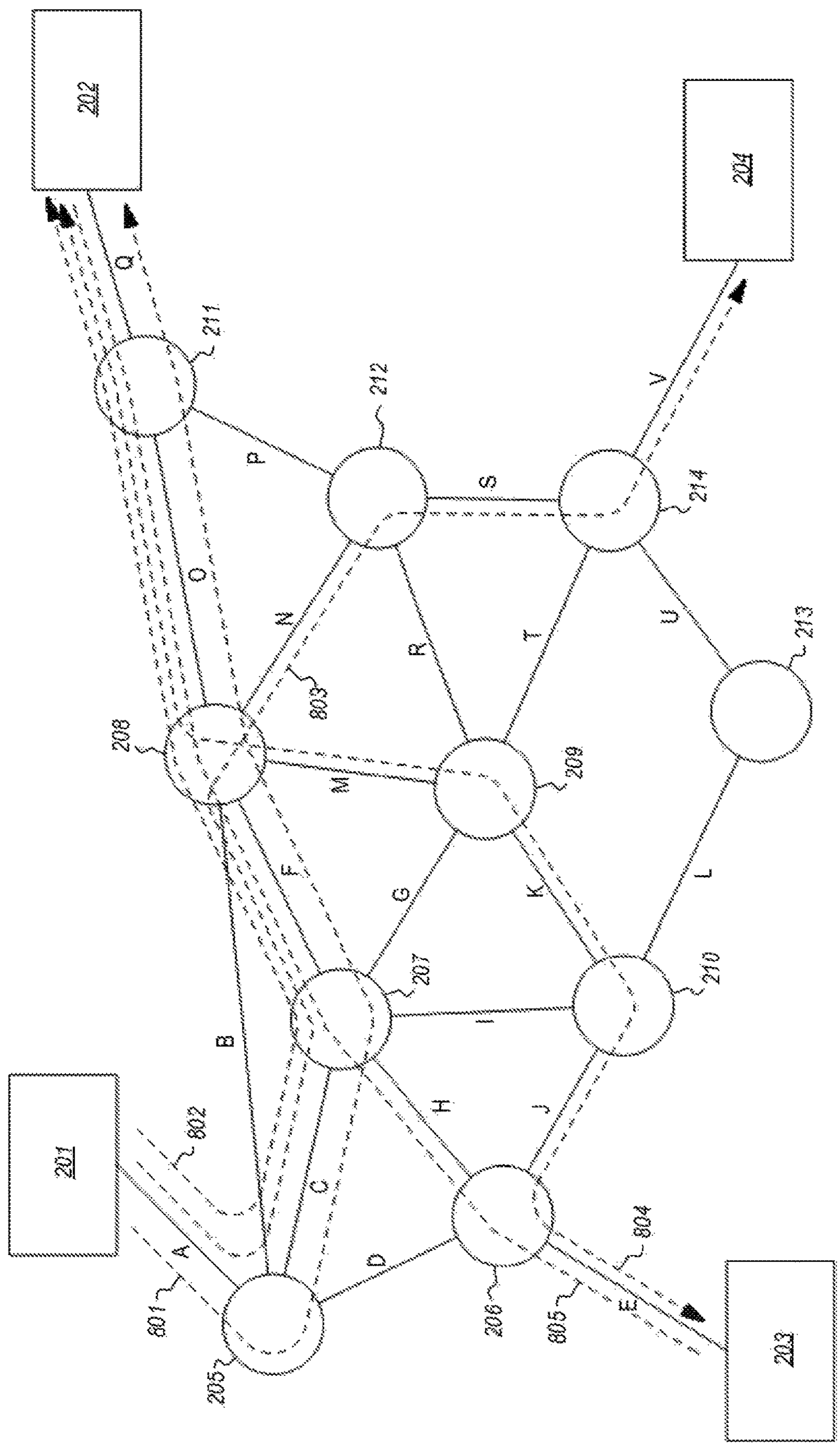
FIG. 8 illustrates the network of FIG. 2 but now with the paths of lower performance flows superimposed, and showing a candidate problem network entity being a transit node.

FIG. 8 illustrates the network 200 of FIG. 2 but now with the paths of lower performance flows superimposed. In this case, there are five problematic paths 801 through 805 discovered. This time, there is no one communication link set that seems to be common amongst all of the faulty paths. Instead, now there is an entire transit node that seems to be common amongst all of the faulty paths. Thus, the transit node 208 may be estimated as a candidate problem network entity. The communications system could also interact with network nodes (or even other monitoring systems) to gather additional information that may increase or decrease probability of a problem for this candidate problem network entity. In the case of confirming a high probability that the transit node 208 has a problem, the mitigation component might instruct each of one or more of the neighboring transit nodes 205, 207, 209, 211 and 212 not to use any of the communication link sets which link them to the transit node 208.

In some cases there may be multiple candidate problem network entities identified. For instance, perhaps the combination of flows 701 through 704 of FIG. 7 and the flows 801 through 805 are identified as faulty. In that case, both the transit node 208 and the communication link of the communication link set G might be identified as faulty. The mitigation component might then reduce or eliminate reliance on either or both of those candidate problem network entities.

Accordingly, the principles described herein provide an effective mechanism for automating the detection of candidate problem network entities and mitigating of reliance upon that candidate problem network entity. Thus, automatic detection of remediation of network problems is described herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for identifying a source of a network performance insufficiency existing within a network, said method comprising:

identifying a set of characteristics of a network communication, the set of characteristics including a definition of a source endpoint where the network communication originates within the network and a destination endpoint where the network communication is finally transported to within the network;

based on the set of characteristics and without having prior information regarding which one or more transport nodes are used to transport the network communication through the network from the source endpoint to the destination endpoint, estimating a plurality of paths that are potentially used to transport the network communication through the network and that identify specific ones of the one or more transport nodes used to transport the network communication through the network from the source endpoint to the destination endpoint, wherein a probability estimation is performed and includes assigning each path in the plurality of paths a corresponding probability, where said corresponding probability indicates a likelihood that the network communication will traverse said each path and where the corresponding probability is determined based on the network communication's set of characteristics;

determining that a particular network entity included within the estimated plurality of paths is causing a network performance insufficiency, said particular network entity being one of a particular transport node included in the one or more transport nodes or, alternatively, a particular link between (i) two transport nodes of the one or more transport nodes, or (ii) a first transport node of the one or more transport nodes and the source endpoint, or (iii) a second transport node of the one or more transport nodes and the destination endpoint; and reducing or eliminating use of the particular network entity for other network communications being transported through the network.

2. The method of claim 1, wherein identifying the set of characteristics includes receiving the set of characteristics from one or more of the source endpoint or the destination endpoint.

3. The method of claim 1, wherein the set of characteristics includes an Internet Protocol (IP) protocol address and transmission control protocol (TCP) port information for the source endpoint.

4. The method of claim 1, wherein the set of characteristics includes an Internet Protocol (IP) protocol address and transmission control protocol (TCP) port information for the destination endpoint.

5. The method of claim 1, wherein the method further includes:

receiving, from either one of the source endpoint or the destination endpoint, performance information corresponding to the network communication.

6. The method of claim 5, wherein the performance information includes one or more of retransmission statistics or latency statistics.

7. The method of claim 1, wherein the particular network entity is the particular transport node.

8. The method of claim 1, wherein the particular network entity is the particular link.

9. The method of claim 1, wherein reducing or eliminating the use of the particular network entity includes eliminating said use.

10. The method of claim 1, wherein the particular network entity is included in a majority of paths included within the plurality of paths while not being included in a minority of paths included within the plurality of paths.

11. A computer system configured to identify a source of a network performance insufficiency existing within a network, said computer system comprising:

one or more processors; and one or more computer-readable hardware storage devices that store instructions that are executable by the one or more processors to cause the computer system to at least:

identify a set of characteristics of a network communication, the set of characteristics including a definition of a source endpoint where the network communication originates within the network and a destination endpoint where the network communication is finally transported to within the network;

based on the set of characteristics and without having prior information regarding which one or more transport nodes are used to transport the network communication through the network from the source endpoint to the destination endpoint, estimate a plurality of paths that are potentially used to transport the network communication through the network and that identify specific ones of the one or more transport nodes used to transport the network communication through the network from the source endpoint to the destination endpoint, wherein a probability estimation is performed and includes assigning each path in the plurality of paths a corresponding probability, where said corresponding probability indicates a likelihood that the network communication will traverse said each path and where the corresponding probability is determined based on the network communication's set of characteristics;

determine that a particular network entity included within the estimated plurality of paths is causing a network performance insufficiency, said particular network entity being one of a particular transport node included in the one or more transport nodes or, alternatively, a particular link between (i) two transport nodes of the one or more transport nodes, or (ii) a first transport node of the one or more transport nodes and the source endpoint, or (iii) a second transport node of the one or more transport nodes and the destination endpoint; and reduce or eliminate use of the particular network entity for other network communications being transported through the network.

12. The computer system of claim 11, wherein the network communication is included in a flow of network communications that share common characteristics such that each network communication in the flow, when being transported through the network, follows at least one path included in the plurality of paths.

13. The computer system of claim 11, wherein determining that the particular network entity is causing the network performance insufficiency is based on received performance information.

14. The computer system of claim 13, wherein the performance information includes retransmission statistics comprising how many retransmissions of network communications have occurred within a determined time period.

15. The computer system of claim 13, wherein the performance information includes retransmission statistics comprising a rate of retransmissions of network communications occurring within a determined time period.

16. The computer system of claim 13, wherein the performance information includes retransmission statistics comprising a percentage of retransmissions of network communications occurring within a determined time period.

17. The computer system of claim 13, wherein the performance information includes retransmission statistics comprising a maximum number of times a same network communication has been attempted for transmission within a determined time period.

18. The computer system of claim 13, wherein the performance information includes latency statistics comprising an average time taken for network communications to traverse one or more paths included in the plurality of paths.

19. The computer system of claim 13, wherein the performance information includes latency statistics comprising a standard deviation in a time taken for network communications to traverse one or more paths included in the plurality of paths.

20. One or more hardware storage devices comprising instructions that are executable by one or more processors of a computer system to cause the computer system to at least:

identify a set of characteristics of a network communication, the set of characteristics including a definition of a source endpoint where the network communication originates within a network and a destination endpoint where the network communication is finally transported to within the network;

based on the set of characteristics and without having prior information regarding which one or more transport nodes are used to transport the network communication through the network from the source endpoint to the destination endpoint, estimate a plurality of paths that are potentially used to transport the network communication through the network and that identify the one or more transport nodes used to transport the network communication through the network from the source endpoint to the destination endpoint, wherein a probability estimation is performed and includes assigning each path in the plurality of paths a corresponding probability, where said corresponding probability indicates a likelihood that the network communication will traverse said each path and where the corresponding probability is determined based on the network communication's set of characteristics;

determine that a particular network entity included within the estimated plurality of paths is causing a network performance insufficiency, said particular network entity being one of a particular transport node included in the one or more transport nodes or, alternatively, a particular link between (i) two transport nodes of the one or more transport nodes, or (ii) a first transport node of the one or more transport nodes and the source endpoint, or (iii) a second transport node of the one or more transport nodes and the destination endpoint; and reduce or eliminate use of the particular network entity for other network communications being transported through the network.

* * * * *